United States Patent Office 3,162,508
Patented Dec. 22, 1964

3,162,508
PREPARATION OF LITHIUM ALUMINUM HYDRIDE
Robert W. Bragdon, Marblehead, and Frank P. Del Giudice, Beverly, Mass., assignors to Metal Hydrides Incorporated, Beverly, Mass., a corporation of Massachusetts
No Drawing. Filed Apr. 6, 1960, Ser. No. 20,273
4 Claims. (Cl. 23—14)

This invention relates to the preparation of lithium aluminum hydride.

The United States patent to H. I. Schlesinger and A. E. Finholt No. 2,567,972, dated September 18, 1951, describes a method for preparing alkali metal aluminum hydrides, such as lithium aluminum hydride and sodium aluminum hydride. This method has been used for the preparation of lithium aluminum hydride on a commercial scale for several years. The method comprises reacting aluminum chloride in diethyl ether with lithium hydride suspended therein. The reaction is illustrated by the equation:

$$4LiH + AlCl_3 \rightarrow LiAlH_4 + 3LiCl \tag{1}$$

The reaction mixture consists of a solution of lithium aluminum hydride in diethyl ether containing insoluble lithium chloride. The lithium chloride is removed by filtration and the diethyl ether is removed from filtrate by evaporation to recover solid lithium aluminum hydride. It will be noted that four moles of expensive lithium hydride are required to produce one mole of lithium aluminum hydride.

In order to avoid the use of the four moles of the expensive lithium hydride required by Equation 1 above, attempts were made to prepare lithium aluminum hydride by metathesis from sodium aluminum hydride and lithium chloride. Attempts were made to carry out this metathesis in tetrahydrofuran since tetrahydrofuran is a solvent for both of the reactants and for lithium aluminum hydride. The reactants were added to tetrahydrofuran and stirred for one and one half hours at room temperature. After this time, the mixture was filtered. The filtrate was found to contain mainly sodium aluminum hydride, the solid residue being mainly lithium chloride.

In the course of further investigations it was discovered that if a solution of lithium chloride in tetrahydrofuran is mixed with a solution of sodium aluminum hydride in tetrahydrofuran at room temperature a substantially complete metathetical reaction takes place with the formation of a solution of lithium aluminum hydride in tetrahydrofuran and a precipitate of sodium chloride. However, since tetrahydrofuran forms an addition compound with lithium aluminum hydride it is difficult to remove the tetrahydrofuran to obtain solid lithium aluminum hydride free of tetrahydrofuran.

Diethyl ether can be easily and completely removed from a solution of lithium aluminum hydride in diethyl ether to obtain solid lithium aluminum hydride. Obviously, therefore, it would be very advantageous if the above methathesis could be conducted in diethyl ether instead of tetrahydrofuran. However, both lithium chloride and sodium aluminum hydride are insoluble in diethyl ether. None of the desired product is formed when anhydrous diethyl ether is added to a flask containing sodium aluminum hydride and lithium chloride in the proportions thereoretically required to react completely to form lithium aluminum hydride and the mixture is refluxed with constant stirring for 18 hours.

The present invention is based upon the discovery if a suitable catalyst is introduced into a slurry of a lithium halide and sodium aluminum hydride and the slurry stirred, a metathetical reaction is initiated and proceeds to substantial completion with constant stirring to form a solution of lithium aluminum hydride in diethyl ether containing precipitated sodium halide. The reaction is illustrated by the equation:

$$LiCl + NaAlH_4 \rightarrow LiAlH_4 + NaCl \tag{2}$$

When the reaction is complete, the precipitated sodium halide may be removed from the solution by filtration and the diethyl ether may be easily removed from the filtrate to obtain solid lithium aluminum hydride. In place of diethyl ether other liquids may be used in which the lithium halide and sodium aluminum hydride are insoluble and lithium aluminum hydride is soluble.

As catalysts for use in the practice of the invention, any hydride may be used which is soluble in the liquid reaction medium. Illustrative examples of suitable catalysts are lithium aluminum hydride, lithium borohydride and etherates of aluminum hydride and aluminum borohydride. The preferred catalyst is lithium aluminum hydride. An extremely small amount of catalyst is effective to initiate the reaction. The reaction has been successfully catalyzed with substantially less than 0.01 percent by weight of catalyst based upon the weight of the liquid reaction used.

The temperature used in the practice of the method of the invention is not critical. Substantially equivalent results are obtained at room temperature and the reflux temperature of the reaction mixture. Any lithium halide may be used but lithium chloride is preferred.

The invention is illustrated further by the following examples.

*Example 1*

11.8 grams (0.28 mole) of lithium chloride and 15.0 grams (0.28 mole) of sodium aluminum hydride were placed in a one liter, 3-neck flask fitted with a reflux condenser and a motor driven stirrer. 200 cc. of diethyl ether were added to the flask and then one gram of lithium aluminum hydride was added. A calcium hydride drying tube was fixed to the reflux condenser to exclude moisture. The slurry was refluxed with constant stirring for about 2 hours and then the reaction mixture was cooled to room temperature and filtered. The filter residue was washed with three separate 50 cc. portions of diethyl ether. The combined filtrate and washings were vacuum evaporated to a solid and the solid was dried in vacuo at 60° C. for one hour. The product assayed 96.4 percent lithium aluminum hydride, the yield being 88.1 percent.

*Example 2*

In this run the procedure used was the same as that described in Example 1 and the quantities of reactants and amount of diethyl ether used were the same. In this run, however, only 0.01 gram of lithium aluminum hydride was used as a catalyst which is less than 0.006 percent by weight based upon the weight of diethyl ether used. The product assayed 95.9 percent lithium aluminum hydride, the yield being 89.5 percent.

We claim:

1. In a method for preparing lithium aluminum hydride by the metathetical reaction of a lithium halide and sodium aluminum hydride, the steps which comprise forming a slurry of the lithium halide and sodium aluminum hydride in diethyl ether, introducing an amount of a catalyst into said slurry effective to initiate said reaction, said catalyst being selected from the group consisting of lithium aluminum hydride, lithium borohydride, and etherates of aluminum hydride and aluminum borohydride, and agitating the slurry containing said catalyst at a temperature between room temperature and the reflux temperature of said ether to cause said lithium halide and sodium aluminum hydride to react to form lithium aluminum hydride.

2. The method as claimed by claim 1 wherein said halide is lithium chloride.

3. In a method for preparing lithium aluminum hydride by the metathetical reaction of a lithium halide and sodium aluminum hydride, the steps which comprise forming a slurry of the lithium halide and sodium aluminum hydride in diethyl ether, introducing an amount of lithium aluminum hydride as a catalyst into said slurry effective to initiate said reaction, and agitating the slurry containing said catalyst at a temperature between room temperature and the reflux temperature of said ether to cause said lithium halide and sodium aluminum hydride to react to form lithium aluminum hydride.

4. The method as claimed by claim 3 wherein said halide is lithium chloride.

References Cited by the Examiner

UNITED STATES PATENTS

| | | | |
|---|---|---|---|
| 2,567,972 | 9/51 | Schlesinger et al. | 23—14 |
| 2,600,370 | 6/52 | Schlesinger et al. | 23—18 X |
| 2,829,946 | 4/58 | Cunningham et al. | 23—14 |
| 2,900,224 | 8/59 | Hinchley et al. | 23—14 |
| 3,076,047 | 1/63 | Seubold | 23—14 X |

FOREIGN PATENTS 820,513  9/59  Great Britain.

MAURICE A. BRINDISI, *Primary Examiner*.